UNITED STATES PATENT OFFICE.

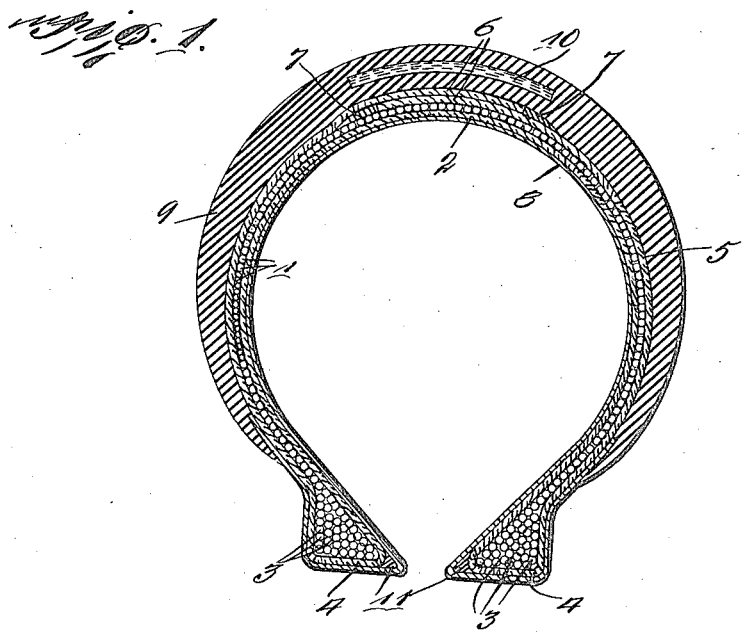
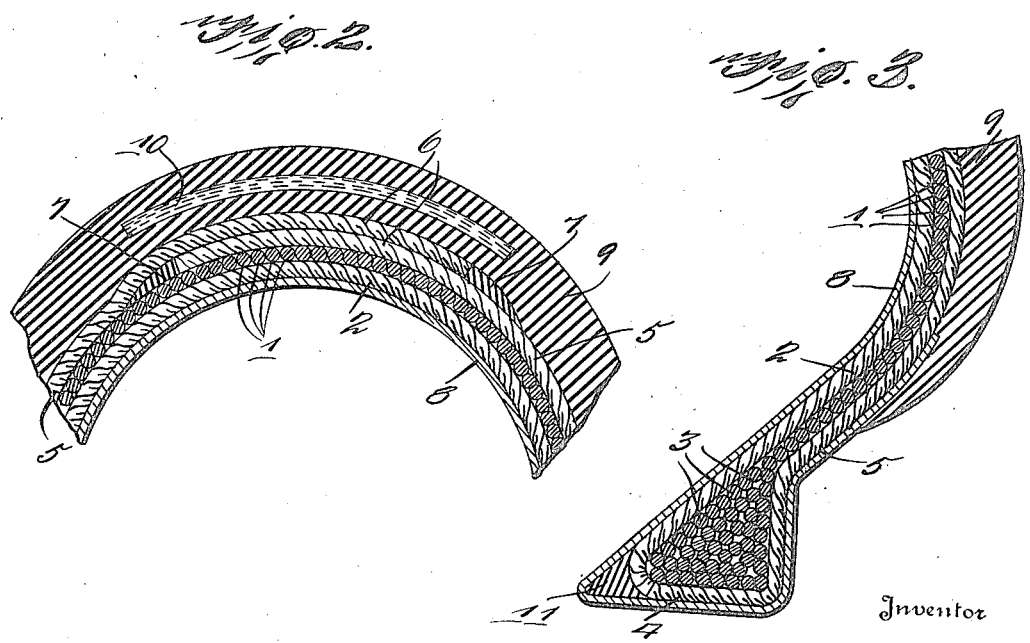

CHARLES L. ARCHER, OF MINNEAPOLIS, MINNESOTA.

CORD TIRE.

1,239,553.      Specification of Letters Patent.     Patented Sept. 11, 1917.

Application filed July 15, 1916. Serial No. 109,526.

*To all whom it may concern:*

Be it known that I, CHARLES L. ARCHER, a citizen of the United States of America, residing at Minneapolis, in the county of Hennepin and State of Minnesota, have invented certain new and useful Improvements in Cord Tires, of which the following is a specification, reference being had therein to the accompanying drawing.

This invention relates to cord tires and has for its principal object the production of a tire in which several plies of cord are positioned upon each other for reinforcing each other and at the same time forming a very strong tire having the maximum amount of life because of its simplicity in construction as well as its durability.

Another object of this invention is the production of a cord tire in which longitudinal cords are positioned between the transversely extending cords, whereby all of the cords fitting upon each other will form a substantially one-piece structure for forming a very strong and inexpensively constructed tire.

Another object of this invention is the production of a cord tire wherein the obliquely or angularly extending cords then being passed about the beads for holding the same in an assembled condition have their ends overlapping so as to form an additional thickness of cords at the tread, whereby all of the cords will fit snugly upon each other, being held against accidental displacement because of their engagement and also because of the fact that the diagonal or transversely extending cords are single units.

Another object of this invention is the production of a cord tire wherein the transversely extending cords are of considerable length so as to fit about the longitudinally extending cords, whereby the points of the tire where the greatest strain takes place will be greatly reinforced, these points being the bead and the tread.

With these and other objects in view this invention consists of certain novel combinations, constructions, and arrangements of parts as will be hereinafter fully described, and claimed.

In the accompanying drawing:—

Figure 1 is a transverse sectional view through a cord tire as constructed in accordance with this invention.

Fig. 2 is an enlarged fragmentary transverse sectional view through a portion of the tire contiguous to its tread.

Fig. 3 is an enlarged fragmentary sectional view of a portion of the tire taken through the heel or bead thereof.

Referring to the accompanying drawing by numerals it will be seen that the cord tire comprises a number of longitudinally extending cords 1 which are positioned so as to bear upon each other and these cords extend entirely around the tire. The transversely extending cords 2 are positioned side by side and extend transversely across the longitudinal axis of the longitudinal cords 1, as clearly shown, fitting upon the inner surfaces of the longitudinal cords 1, whereby the transversely extending cords will form the inner ply, as will be seen by referring to Fig. 2.

In order to form the heels or beads of the tire there are provided a number of longitudinal cables 3 carried adjacent each other and formed so as to provide enlarged substantially triangular shaped beads, as shown in Figs. 1 and 3. The transversely extending cords 2 are wound about the cables 3 so as to hold all of these cables upon each other thus forming a very durable bead for the tire. The cables 4 of the transversely extending cords which are wound about the cables 3 are then positioned upon the outer surface or portions of the longitudinal cords 1, as shown at 5, so as to cause the ends to overlap as shown at 6. These overlapping ends are carried in direct alinement with the tread of the tire, thus greatly reinforcing the same when in operation. It will be noted that the wedge-like filler strips 7 are carried so as to bear against the extreme ends of the cords, thereby forming a filler which will cause the cords to allow the tire to ride evenly since these fillers will taper off and form a comparatively smooth outer surface.

The lining 8 which may be of any suitable material may be positioned upon the transversely extending cords 2 and wound about the heels or beads having its longitudinal side edges embraced by the rubber casing 9 positioned upon the transversely extending cords. The breaker strip 10 is positioned in the usual manner within the rubber casing 9 in alinement with the tread for reinforcing the tire when in use. It is further obvious that in order to fill out the lining 8 adjacent the beads or heels longitudinal filler strips 11 may be carried within the lining 8 so as to bear upon the portions 4 of the transversely extending cords 2 which are wound about the longitudinally extending cables 3 which constitute the beads or heels of the tire.

It is well known that the greatest strain upon a tire takes place upon the tread thereof and upon the beads and heels. This is so because of the fact that the supporting strain as well as the wearing action of the tire when in use will take place upon the bead, but since the transversely extending cords have their ends 6 overlapping there will be a double thickness formed by the overlapping ends or one more thickness than at any other portion of the several plies or layers of cords. It will be seen that the beads or heels are greatly reinforced because the transversely extending cords extend continuously around so as to thoroughly reinforce the cables 3, thereby preventing any possibility of the accidental displacement of these cables, thus insuring a very strong and substantial one-piece tire and facilitating the retaining of the tire upon the felly of the wheel. This construction is very durable, inasmuch as the form of the transversely extending cords permits the longitudinally extending cords to be easily placed thereon, after which the transversely extending cords may be wound about the beads and then positioned upon the outer surface of the longitudinally extending cords, having their ends overlapping, as above set forth. The tapering wedge-like filler strips 7 will extend from the extreme ends of the transversely extending cords, thus forming fillers, so as to provide an even riding or wearing surface upon the outer portions of the transversely extending cords.

From the foregoing description it will be seen that a very efficient cord tire has been produced wherein the longitudinally extending cords are interposed between the transversely extending cords all of which are rubberized, so as to fit snugly in engagement with each other for comprising substantially one-piece structures, while the length of the transversely extending cords is such as to cause these transverse cords to entirely inclose the longitudinally extending cords, thus preventing any possibility of the accidental displacement of these longitudinally extending cords, besides forming very strong beads or heels and reinforcing the tread of the cord tire.

What is claimed is:—

1. In a tire of the class described, the combination of a plurality of longitudinally extending cords, transversely extending cords positioned upon said longitudinally extending cords, beads carried upon said longitudinally extending cords, said transversely extending cords embracing said beads for holding the same against accidental displacement, said transversely extending cords then fitting upon the outer surface of said longitudinally extending cords, portions of said transversely extending cords adjacent their ends overlapping in alinement with the tread of the tire, tapered filler strips positioned upon said transversely extending cords and engaging the extreme ends thereof so as to cause the tapered structure to have a comparatively even outer surface, and a casing carried upon said transversely extending cords.

2. In a tire of the class described, the combination of a plurality of longitudinally extending cords, longitudinally extending cables positioned upon said longitudinally extending cords for forming beads or heels, transversely extending cords positioned upon said longitudinally extending cords, said transversely extending cords being wound about said beads or heels for holding the same in assembled positions, said transversely extending cords then fitting snugly upon the outer surface of said longitudinally extending cords, the ends of said transversely extending cords overlapping, filler means positioned upon the extreme ends of said transversely extending cords so as to form a substantially even outer surface, a lining positioned upon said transversely extending cords and fitting about said beads or heels, and a casing positioned upon said transversely extending cords for holding said overlapping ends in engagement with each other, whereby a substantially one-piece tire is produced.

3. In a tire of the class described, the combination of a plurality of longitudinally extending cords, transversely extending cords positioned upon said longitudinally extending cords, heels carried upon said longitudinally extending cords, said transversely extending cords being wound about said heels for holding the same in assembled positions, said transversely extending cords then fitting snugly upon the outer surface of said longitudinally extending cords, the ends of said transversely extending cords overlapping, filler means positioned upon the extreme ends of said transversely extending cords so as to form a substantially even outer surface, and a casing positioned upon said transversely extending cords.

4. In a tire of the class described, the combination of a plurality of longitudinally extending cords, transversely extending cords, positioned upon said longitudinally extending cords, portions of said transversely extending cords adjacent their ends overlapping in alinement with the tread of the tire, tapered filler strips positioned upon said transversely extending cords and engaging the extreme ends thereof so as to cause the tapered strips to present a comparatively even outer surface, and a casing carried upon said transversely extending cords.

5. In a tire of the class described, the combination of an interposed ply of material, an outer ply of material positioned upon said interposed ply of material and entirely incasing the same, the portions of said outer ply of material adjacent its side edges overlapping in alinement with the tread of the tire, filler means positioned upon said side edges of said outer ply of material so as to form a substantially even outer surface, and a casing positioned upon said outer ply of material and said filler means.

6. In a tire of the class described, the combination of an interposed ply of material, an outer ply of material positioned upon said interposed ply of material and entirely incasing the same, beads carried by said outer ply of material, the portions of said outer ply of material adjacent its side edges overlapping in alinement with the tread of the tire, filler means positioned upon said side edges of said outer ply of material so as to form a substantially even outer surface, and a casing positioned upon said outer ply of material and said filler means.

7. In a tire of the class described, the combination of an interposed ply of material, an outer ply of material positioned upon said interposed ply of material and entirely incasing the same, the portions of said outer ply of material adjacent its side edges overlapping in alinement with the tread of the tire, tapered filler strips positioned upon said outer ply of material and engaging the side edges thereof so as to form a comparatively even outer surface, and a casing carried upon said outer ply of material.

8. In a tire of the class described, the combination of an interposed ply of material, an outer ply of material positioned upon said interposed ply of material and entirely incasing the same, beads carried by said outer ply of material, the portions of said outer ply of material adjacent its side edges overlapping in alinement with the tread of the tire, tapered filler strips positioned upon said outer ply of material and engaging the side edges thereof so as to form a comparatively even outer surface, and a casing carried by said outer ply of material.

In testimony whereof I hereunto affix my signature.

CHARLES L. ARCHER.